United States Patent [19]

Antonaccio

[11] 3,773,395
[45] Nov. 20, 1973

[54] SLIDING SUPPORT WITH ADJUSTABLE SHOCK BLOCK

[75] Inventor: Jack A. Antonaccio, New City, N.Y.

[73] Assignee: Buildex Incorporated, Jericho, N.Y.

[22] Filed: Jan. 13, 1972

[21] Appl. No.: 217,529

[52] U.S. Cl. .................................. 308/3.8, 312/348
[51] Int. Cl. ............................................. F16c 21/00
[58] Field of Search ...................... 308/3.8, 3.6, 6 R; 312/348, 341, 343, 344; 16/82

[56] References Cited
UNITED STATES PATENTS

| 2,752,219 | 6/1956 | Yonkers | 312/341 R |
| 2,261,504 | 11/1941 | Saunders | 308/6 R |
| 2,780,501 | 2/1957 | Rosenberg | 308/6 R |
| 3,650,578 | 3/1972 | Del Vecchio | 308/3.8 |

Primary Examiner—Charles J. Myhre
Assistant Examiner—R. H. Lazarus
Attorney—Howard C. Miskin

[57] ABSTRACT

A slide mechanism includes at least two telescoping channel shaped slide members or supports having confronting race defining grooves formed in their side legs, ball bearings being retained between the races. The outer channel has a longitudinal slot at the rear end of its cross web and a screw extends between the outer channel side legs to contract these legs on opposite sides of the slot with the tightening of the screw, so that with the telescoping closing of the slide members, some of the ball bearings are tightly embraced by the correspondingly contracted races to lock the slide member against shock and vibration. A rubber sleeve on the screw extends between the side legs and functions as a bumper.

8 Claims, 4 Drawing Figures 3,773,395

PATENTED NOV 20 1973

SLIDING SUPPORT WITH ADJUSTABLE SHOCK BLOCK

BACKGROUND OF THE INVENTION

The present invention relates generally to improvements in slidable supports and it relates particularly to an improved shock and vibration resistant slide mechanism.

Slide mechanism of the telescoping slide member type wherein two or more telescoping slide members or tracks are mutually supported by ball bearings engaged by races between confronting faces of the slide members are widely used in many applications, such as for the support of filing cabinet drawers or for the support of various electronic components and assemblies, to which access may be frequently required. The conventional slide mechanism, especially those on which are mounted electronic components, possess an important drawback, in that in its contracted or closed state there is considerable play between the associated slide members, so that the mechanism is not resistant to shock or vibration and often any such shock or vibration is aggravated by the slide mechanism with resulting damage to the slide supported component or device. Many mechanisms have been employed and proposed to increase the shock and vibration resistance of telescoping slide mechanisms, but these possess numerous disadvantages. They must be constructed to very close tolerances, are unreliable, deteriorate with use, are difficult to install and are not suitably adjustable and otherwise leave much to be desired.

SUMMARY OF THE INVENTION

It is thus a principal object of the present invention to provide and improved slide mechanism.

Another object of the present invention is to provide an improved slide mechanism of the telescoping slide member type having adjustable means for reducing amplification of shock or vibration.

Still another object of the present invention is to provide an improved telescoping slide member mechanism, which, when in closed position, is highly resistant to shock and vibration.

A further object of the present invention is to provide a slide mechanism of the above nature characterized by its ruggedness, reliability, high wear resistance, ease of installation and adjustment, low cost, and high versatility and adaptability.

The above and other objects of the present invention will become apparent from a reading of the following description taken in conjunction with the accompanying drawing which illustrates a preferred embodiment thereof.

In a sense the present invention contemplates the provision of a slide mechanism comprising at least two slidably telescoping slide members having longitudinally extending confronting races which converge longitudinally at end portions thereof and ball bearings disposed betweeen the races, at least some of the ball bearings being embraced by the race inner end portions when said slide members are in relatively contracted condition.

According to a preferred form of the improved slide mechanism, each of the slide members comprises a channel having a cross web and side legs, the side legs of one channel are disposed inwardly of and confront the side legs of the other channel and the confronting faces of the channel legs have race defining grooves which slidably embrace groups of suitably retained ball bearings. The rear section of the cross web of the outer slide channel is longitudinally slotted and a screw or other fastener means extends through an opening in the rear of one of the channel side legs and engages an axially aligned tapped bore in the other side leg on opposite sides of the slot and the screw is tightened to contract the outer races. A bumper defining rubber sleeve engages the screw intermediate of its ends.

The improved slide mechanism is highly shock and vibration resistant, is rugged, reliable, easy to install and adjust, if of low cost and operates in a highly superior manner.

DESCRIPTION OF THE PREFERRED EMBODIMENT

Figures 1, 2:
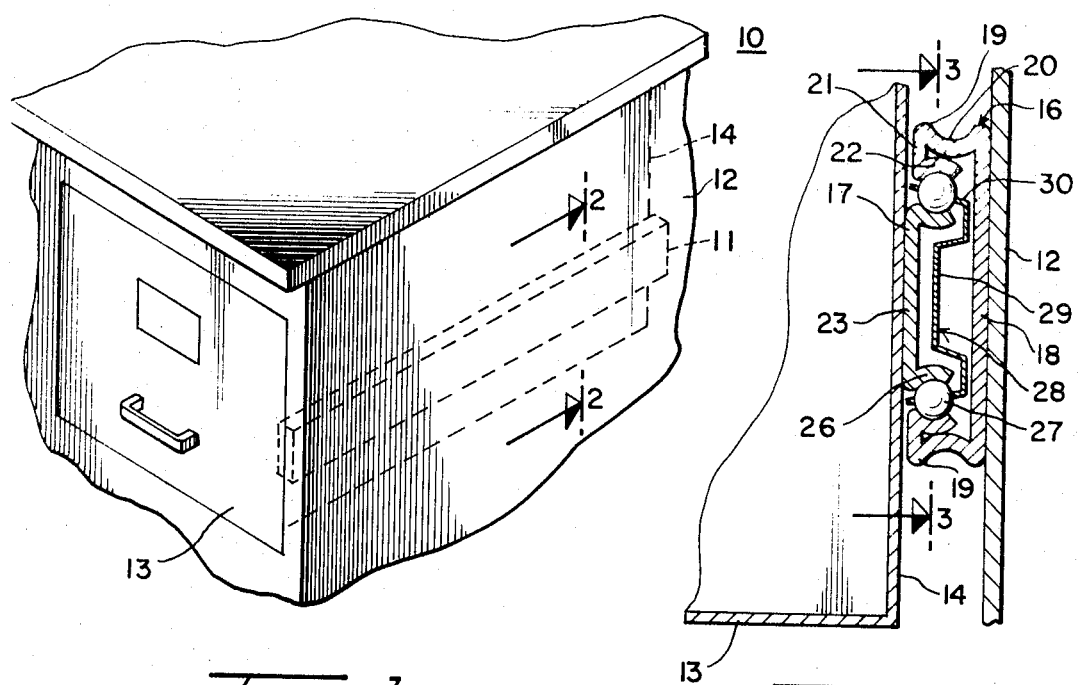
FIG. 1 is a fragmentary perspective view of a cabinet employing a slide mechanism embodying the present invention.
FIG. 2 is an enlarged sectional view taken along line 2—2 in FIG. 1.
Figure 3:
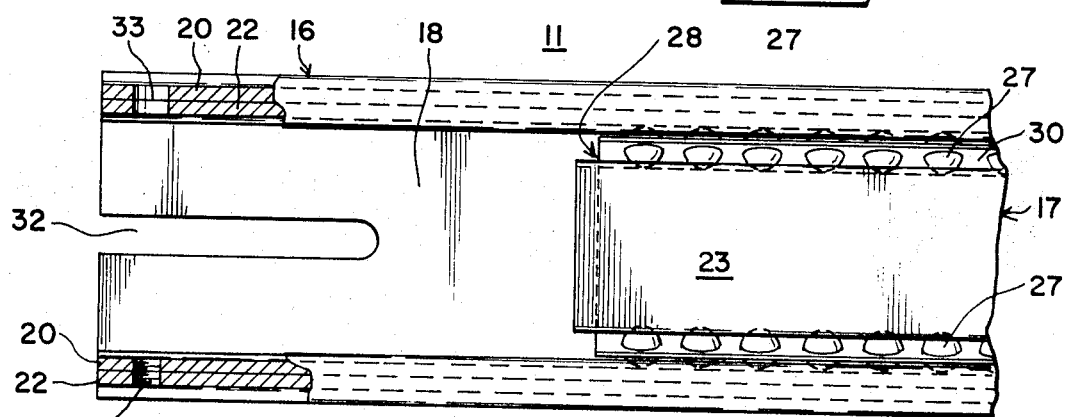
FIG. 3 is a sectional view taken along line 3—3 in FIG. 2; the slide being shown in a partially extended condition and with portions thereof omitted.

Referring now to the drawing, which illustrates a preferred embodiment of the present invention, the reference numeral 10 generally designates a cabinet employing the improved slide mechanism 11, it being noted that while the slide mechanism is illustrated as being of the two slide member or track type and applied to a cabinet, it may consist of more than two telescoping slide members, for example three, and may be applied to devices other than cabinets, or example electronic component shelves and cabinets and the like. The cabinet 10 is, except for the improved slide mechanism, of conventional construction and comprises a housing including vertical longitudinal side walls 12 and one or more drawers 13, each of which includes a pair of vertical side walls 14 spaced inwardly of respective side walls 12, and longitudinally slidably supported thereon by opposite slide mechanisms 11.

Each of the slide mechanisms 11, shown in the illustrated embodiment by way of example as being of a two slide member type, includes an outer slide member or track 16 suitably secured to a respective side wall 12 and an inner slide member or track 17 suitably secured to a corresponding drawer side wall 14. The outer slide member 16, which may function as an intermediate slide member in a three slide member mechanism, in the known manner, is of channel shape including a cross web 18 superimposed on the face of wall 12 and inwardly directed similarly oppositely shaped upper and lower longitudinally extending side arms 19. Each side arm 19 includes transversely arcuate legs 20 extending inwardly from the top and bottom edges of web 18, the concave outer faces of legs 20 defining races when tracks 16 are employed as intermediate slide members. Projecting toward each other from the inner ends of legs 20 are short vertical legs 21 which terminate in transverse legs 22 projecting outwardly toward web 18, the confronting concave faces of legs 22 defining first races.

The inner slide member 17 is also channel shaped and includes a longitudinally extending vertical cross web 23 superimposed on the outer face of drawer wall 14. Projecting outwardly from the top and bottom edges of web 23 toward web 18 are top and bottom transversely arcuate arms 26, which are spaced vertically inwardly of respective race legs 22. The faces of arms 26 confronting legs 22 are concave and define second races which cooperate with the first races.

A plurality of longitudinally spaced ball bearings 27 are entrapped between and rollably engage the first and second races to slidably couple slide members 16 and 17. A longitudinally extending ball bearing retainer 28 includes a vertical web 29 and top and bottom longitudinal arms 30 projecting from the web 29 between confronting front and second races and having longitudinally spaced circular openings engaging respective ball bearings 27.

A longitudinally extending slot 32 is medially formed in the rear portion of web 18 and extends to the rear edge thereof. Upper and lower coaxial vertical bores 33 and 34 respectively are formed in the rear portions of upper and lower slide member arms 19 on opposite sides of the rear end of slot 32, the lower bore 34 being threaded. A screw 36 extends through opening 33 and has a threaded shank 37 engaging the tapped bore 34 and a head 38 bearing on the top face of top arm 19. A bumper defining rubber sleeve 39 engages the screw 36 and extends between the confronting faces of arms 19.

Figure 4:
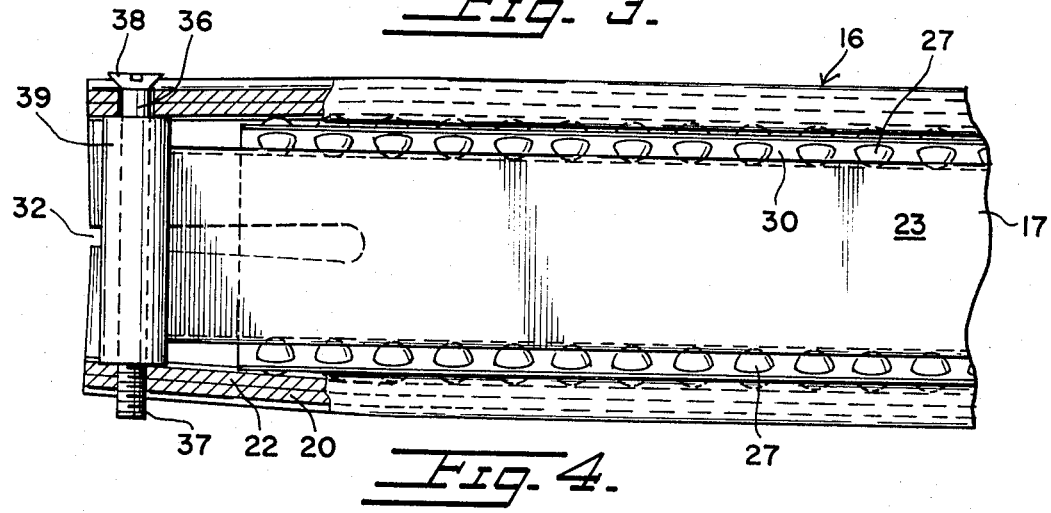
FIG. 4 is a view similar to FIG. 3 with the slide being shown in its completely assembled condition and in a fully contracted state.

The screw 38 is tightened in openings 33 and 34 to effect the contraction of the rear portions of slide member arms 19 on opposite sides of slot 32, as shown in FIG. 4, so that the arms 19 converge rearwardly. As a consequence the first and second ball bearing races, corresponding to legs 22 and 26, of each pair thereof converge rearwardly and the amount of convergence is adjusted by the amount of tightening of the screw 36. The provision of the slot 32 facilitates the effecting of the convergence of the races as above set forth.

When the slide mechanism 11 is in its contracted or closed condition with center track 17 being in its rear position, as shown in FIG. 4, at least the rearmost ball bearings 27 are tightly embraced by the confronting converging races since these ball bearings are wedged or jammed betweeen the races. As a consequence, relative motion between tracks 16 and 17 is prevented whereby to substantially eliminate any shock or vibration and prevent amplification. Moreover, when employed in a three track slide mechanism, where track 16 defines an intermediate track and is free of wall 12 the intermediate track defined by track 16 will return to the same location each time the slide mechanism is closed or contracted. The magnitude of the jamming or wedging of the ball bearings between the rear sections of the races are regulated by adjusting screw 36 to the desired operating parameters and to compensate for any wear attendant to repeated cycling.

While the illustrated embodiment discloses using ball bearings with races, pins extending into the ball channel formed by the grooves can be used to prevent escape of the balls. Other friction reducing means can also be used.

Also, the adjustment can be provided to compensate for varying tolerance conditions and operating conditions.

While there has been described and illustrated a preferred embodiment of the present invention, it is apparent that numerous alterations, omissions and additions may be made without departing from the spirit thereof.

What I claim is:

1. A slide mechanism comprising at least two slidably telescoping slide members having longitudinally extending confronting races which converge longitudinally at the rear end portions thereof, and are substantially parallel along the portions thereof forward of said rear portions and ball bearings disposed between said races, at least some of said ball bearings being relatively tightly embraced by said race rear end portions when said slide members are in relatively contracted condition and being relatively loosely embraced by said races when said slide members are extended from their contracted condition a predetermined amount.

2. The slide mechanism of claim 1, including means for adjusting the degree of convergence of said races.

3. The slide mechanism of claim 1, wherein said slide members include transversely spaced pairs of said confronting races, each pair of said races converging longitudinally at end portions thereof, and ball bearings disposed between the races of each of said race pairs and at least some being tightly embraced by said end portions when said slide members are in a relatively contracted condition.

4. The slide mechanism of claim 1, wherein a first of said slide members comprises a longitudinally extending channel including a cross web and parallel side legs having inwardly facing race defining first grooves and a second of said slide members telescopes said first slide member and has second race defining grooves formed therein confronting said first races, the first and second races of each pair converging at their rear end portions toward the respective ends of said slide members, and ball bearings disposed between the races of each of said race pairs and being tightly embraced by said race end portions when said slide members are in their relatively contracted condition.

5. A slide mechanism comprising at least two slidably telescoping slide members having longitudinally extending confronting races which converge longitudinally at end portions thereof, ball bearings disposed between said races, at least some of said ball bearings being tightly embraced by said race end portions when said slide members are in relatively contracted condition, a first of said slide members comprising a longitudinally extending channel including a cross web and parallel side legs having inwardly facing race defining first grooves and a second of said slide members telescoping said first slide member and having second race defining grooves formed therein confronting said first races, the first and second races of each pair converging at their rear end portions toward the respective ends of said slide members, ball bearings disposed between the races of each of said race pairs being tightly embraced by said race end portions when said slide members are in their relatively contracted condition, said channel having a longitudinal slot formed in the rear end portion of the web thereof, and means for transversely contracting said web on the opposite sides of said slot to converge said first races at the rear portions thereof.

6. The slide mechanism of claim 5, wherein said channel legs have transversely axially aligned first and second openings formed in the rear end portions thereof one of said openings being tapped and said contracting means comprises a screw registering with said openings and engaging said tapped opening.

7. The slide mechanism of claim 6 including a rubber sleeve engaging said screw between said first races.

8. A slide mechanism comprising at least two slidably telescoping slide members having longitudinally extending confronting races which converge longitudinally at end portions thereof, ball bearings disposed between said races, at least some of said ball bearings being tightly embraced by said race end portions when said slide members are in relatively contracted condition, a first of said slide members comprising a longitudinally extending channel including a cross web and parallel side legs having inwardly facing race defining first grooves and a second of said slide members telescoping said first slide member and having second race defining grooves formed therein confronting said first races, the first and second races of each pair converging at their rear end portions toward the respective ends of said slide members, ball bearings disposed between the races of each of said race pairs being tightly embraced by said race end portions when said slide members are in their relatively contracted condition, and said second slide member comprising a second channel telescoping said first channel and including a cross web and parallel side legs having said second race defining grooves formed therein.

* * * * *